Aug. 23, 1949.　　　　　L. W. PARKER　　　　　2,479,589

ROTOR FOR AXIAL AIR GAP MOTORS AND GENERATORS

Filed Aug. 10, 1944

INVENTOR.
Louis W. Parker
BY C. C. Horton
Attorney

Patented Aug. 23, 1949

2,479,589

UNITED STATES PATENT OFFICE 2,479,589

ROTOR FOR AXIAL AIR GAP MOTORS AND GENERATORS

Louis W. Parker, Woodside, N. Y.

Application August 10, 1944, Serial No. 548,814

2 Claims. (Cl. 172—120)

This invention relates to dynamo-electric machinery, and more particularly to electric motors and generators.

It is an object of this invention to produce electric motors and generators in which a considerably smaller quantity of iron is used for a given output than has heretofore been possible.

It is an object of this invention to provide an improved motor or generator in which the size and weight of the machine for a given capacity is considerably reduced.

It is still a further object of my invention to provide a motor or generator in which the iron or steel is utilized in a more efficient manner providing a greater concentration of flux lines in a given cross-section of iron.

It is still a further object of my invention to provide a machine which is particularly adapted to quantity production, and having rotors and stators which may be combined in varying numbers to produce machines of varying capacity.

Still other objects and advantages of my invention will be apparent from the specification.

Figure 2:
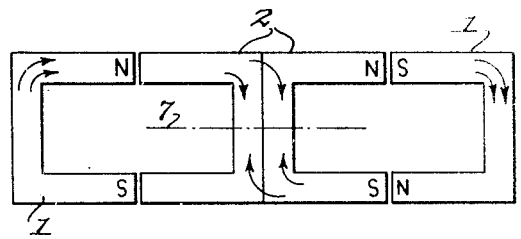
Figure 3:
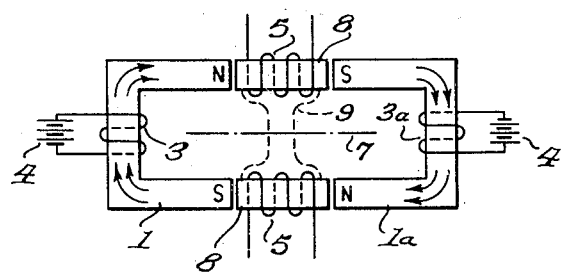
Figure 4:
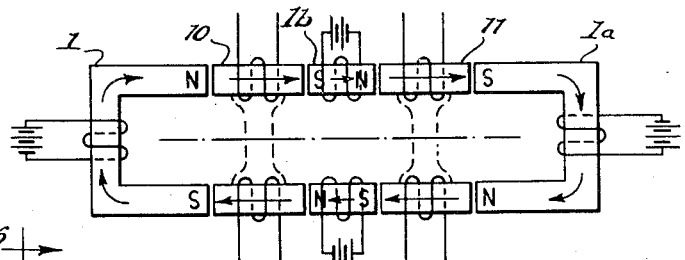
Figure 5:
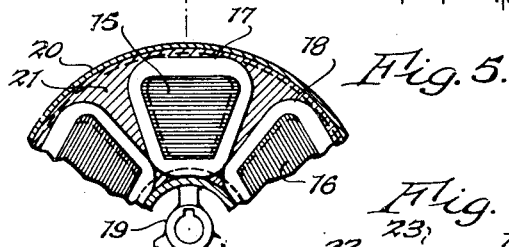
Figure 6:
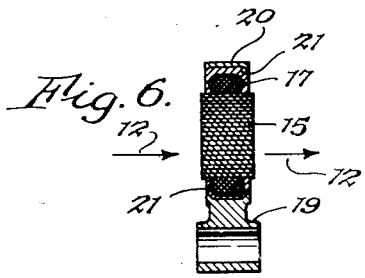
Figure 7:
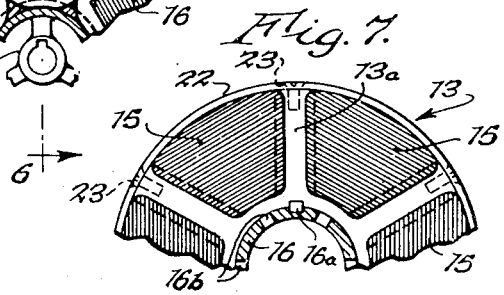

The features of novelty which I believe to be characteristic of my invention are set forth with particularity in the appended claims. My invention itself, however, both as to its fundamental principles and as to its particular embodiments, will best be understood by reference to the specification and accompanying drawing, in which Figs. 1 and 2 are diagrammatic views of a simple motor or generator showing the development of my invention, Fig. 1a illustrates one way in which the machine of Fig. 1 may be improved in accordance with my invention, Figs. 3 and 4 are diagrammatic views of improved forms of motors or generators according to my invention, Fig. 5 is a partial end view of a rotor according to my invention, partly in section, Fig. 6 is a section thereof on lines 6—6 of Fig. 5, and Fig. 7 is a partial end view of a rotor of an induction motor in accordance with my invention.

Figure 1:
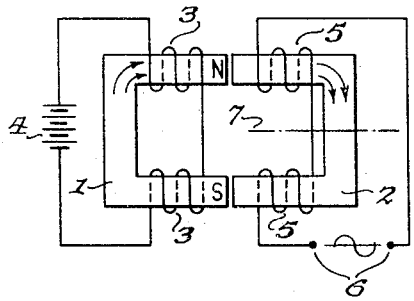
Figure 1A:
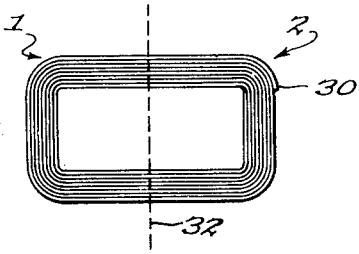

Referring now more particularly to Fig. 1, I and 2 may be U-shaped iron or steel bars. Bar I may be considered to be the stator and may be provided with field coils 3, surrounding the arms, and energized by a suitable source of direct current, such as 4. The direction of windings and the manner of connection of the coils 3 is so chosen that a magnetic flux is established in the stator I, the upper pole face being, for example, the north pole, as indicated by the letter N, and the bottom pole the south pole, as indicated by the letter S.

Coils 5 may be mounted on the arms of the rotor 2, and their direction of winding and connection is such that the voltages generated in each of coils 5 add cumulatively. The ends of the coils 5 may be brought out to terminal 6, which may be slip rings or connections to a suitable commutator.

The rotor 2 is preferably mounted for rotation about an axis 7, lying in the plane of the paper. As will be understood, the magnetic circuit is completed from the north and south poles of the stator I through rotor 2, the flux taking the path indicated by the arrows.

If, now, rotor 2 be driven by power applied to it, the machine will act as a generator, delivering alternating current at the terminal 6, or direct current if a commutator is provided. Conversely, if direct current is supplied from an external source to the commutator, the machine will operate as a motor.

If, now, two identical such machines be placed back-to-back, as indicated in Fig. 2, and a good magnetic joint be provided between the two at the surface of contact, a change in flux distribution takes place. For purposes of simplicity in connection with Fig. 2, I have omitted the coils.

It will be seen that now the flux originating in the left-hand unit 2 has twice the cross-sectional area to travel in passing from the top to the bottom plate, but it will also be observed that this same area is traversed by the flux of the second unit in an opposite direction. In other words, the connection portion of the U's no longer is affected magnetically since the resultant flux therein is zero, and this portion of the flux path may be removed, as shown in Fig. 3, which now comprises stator units I and Ia, and rotor unit comprising the two bars 8 mounted on opposite ends of a connecting member 9, the rotor being rotatable about the axis 7 lying in the plane of the paper.

In this instance I have included coils 3 and 3a surrounding the respective stators I and Ia and energized by a suitable source of potential 4 and coils 5 surrounding the bars 8a and 8b. The coils 5, as will be understood, may be connected either in series or parallel, depending on the output desired, and it will be seen that the capacity of the machine is now substantially twice that of the simple machine shown in Fig. 1, but the weight of iron or steel employed is less than twice, since it has been reduced by the elimination of the center portion of the U's.

A still further carrying forward of this principle is shown in Fig. 4, which represents in diagrammatic form the derivation of a machine made by placing two of the machines of Fig. 3 back-to-back and eliminating the portions of iron through which the flux is neutralized. As will be seen, this machine now comprises end stator portions 1 and 1a in the form of U's, two rotor portions 10 and 11 and intermediate or center stator portion 1b, and whereas the capacity of the machine shown in Fig. 4 is twice that shown in Fig. 3, the amount of iron or steel required is not twice, because of the saving of iron where the flux distribution is zero.

As will be understood, this principle may be applied to produce a rotor having 3, 4, or even more sections longitudinally, there being, of course, always one more stator section than the number of rotor sections; and while, in the illustrations thus far given, for the sake of simplicity, the machines diagrammatically indicated have only two poles, it will be understood that a considerably larger number of poles may be used, as six, eight, or more.

It is evident that the principles so far described reduce the amount of iron required for a given machine capacity. However, with the application of still other principles I am able to reduce this amount still further. It may be stated that for the most efficient utilization of the iron the magnetic field should travel through a straight line as far as possible. Wherever the field has to bend, a greater than minimum amount of iron must be used.

In accordance with this principle, it will be seen that the flux path according to my invention provides the maximum straight line portions and is, therefore, highly efficient. If, now, the flux path be made of high permeability silicon steel arranged so that the flux travels in the direction in which the steel was rolled, a still further improvement in saving of iron is obtained. By such a construction, permeability of the steel is approximately doubled, and the flux-carrying capacity is increased by approximately one-third.

This advantage of high permeability silicon steel cannot be utilized in motors or generators of conventional construction for the reason that it is not possible to arrange the magnetic field of such machines so that the flux will always go in the direction of rolling of the steel, but in the machine according to my invention laminated high permeability silicon steel may be used in a manner to take full advantage of these properties.

How this principle may be utilized in the machine of Fig. 1 is indicated by Fig. 1a, where the stator 1 and rotor 2 may be formed by winding a ribbon or tape of high permeability silicon steel 30 covered with cement on a mandrel until the desired dimensions are obtained. After the cement has set, the mandrel may be withdrawn and the block cut in the plane of the dotted line 32. The U-shaped laminated blocks may then form the stator 1 and rotor 2 of Fig. 1.

Since the ribbon or tape is rolled in the direction of its length, it will be observed that the flux is always in the direction in which the steel was rolled, this providing for most efficient utilization of the steel.

Referring now more particularly to Figs. 5 and 6, I have shown a rotor so constructed. In this instance the rotor may comprise a hub 19 carrying coils 17 and 18 (and also four other coils not shown or numbered). The axis of these coils will be observed to be parallel to the axis of rotation, and the space within the coils may be filled with laminations 15 in coil 17 and 16 in coil 18. These laminations are, as stated, made of high permeability silicon steel which has been rolled in the direction indicated by arrows 12. If desired, the radial surfaces of the lamination blocks may be routed out or channelled to receive the windings.

In forming the pole pieces 15 and 16, the laminations are fastened together with insulating cement or glass compound to make one solid piece, and may then be cut and machined or ground to the desired shape and size. Laminated high permeability silicon steel cemented together into one block and having very desirable magnetic characteristics, for this purpose, is commercially available on the market under the name "Hipersil."

After the coils and pole pieces are placed in the desired position, outside ring 20 may be placed in position, and the empty spaces filled in with a suitable hard plastic or other insulating compound, as at 21. After the plastic is cured or has set, it will be observed that the rotor forms one solid member. Since the specific gravity of most plastics is less than 2 and the hub is preferably made of Duralumin or other light material, it will be seen that the weight of the rotor is relatively quite low for its power-handling capacity.

Ventilation may be accomplished without special provision for it since air will be drawn in between the spokes near the center of the hub and discharged radially by centrifugal force through the gaps between rotors and stators.

The motors and generators according to my invention lend themselves readily to mass production, because all pole pieces and coils used in the rotors and stators may have the same physical shape and size. Generators or motors with various load capacities may, therefore, be easily made by assembling more or less stators and rotors into the complete machine, instead of making machines of different diameters. As will be understood, manufacture may be further simplified by using pole pieces made of "Alnico" permanent magnets for rotors or stators. Elimination of coils, sliding contacts, and D. C. sources for magnetizing may be accomplished when the rotor is formed of "Alnico."

In the case of squirrel cage induction motors according to my invention, wheel 13, as shown in Fig. 7, having rim 22, copper, Duralumin, or aluminum spokes 13a for supporting the pole pieces 15 as well as for conducting the electric current, and the rotor construction may be mounted on hollow shaft 16 and secured by key 16a. With this construction no windings as such are employed on the rotor, the current flowing through the hub, spokes, and rim. The laminations may be cut away to fit between the spokes both circumferentially and axially and are held in place by the spokes and by rim 22 which may be fastened to the spokes as by screws 23.

For cooling, the shaft may be made hollow and may be provided with openings 16b spaced radially and axially, so that air may be drawn in from the ends and discharged by centrifugal force through the air gaps.

While I have shown and described certain preferred embodiments of my invention, it will be understood that modifications and changes may be made without departing from the spirit and scope thereof, as will be clear to those skilled in the art.

In this application I have particularly pointed out and distinctly claimed the part, improvement, or combination which I claim as my invention or discovery, and I have explained the principles thereof and the best mode in which I have contemplated applying those principles so as to distinguish my invention from other inventions.

I claim:

1. As a new article of manufacture, an induction motor rotor comprising a wheel of non-magnetic electric conductor material having a hub, radially disposed spokes, and a separate rim of non-magnetic material, a laminated core of high permeability silicon steel disposed with the direction of rolling parallel to the axis of rotation in the space between said spokes, said rib being secured to said spokes.

2. As a new article of manufacture, an induction motor rotor comprising a wheel of non-magnetic electric conductor material having a hub, radially disposed spokes, and a separate rim, a laminated core of high permeability silicon steel disposed with the direction of rolling parallel to the axis of rotation in the space between said spokes, said cores extending circumferentially beyond said spokes and held in place thereby, said rim being secured to said spokes.

LOUIS W. PARKER.

REFERENCES CITED

The following references are of record in the file of this patent:

UNITED STATES PATENTS

| Number | Name | Date |
|---|---|---|
| 168,018 | Heikel | Sept. 21, 1875 |
| 234,443 | Weston | Nov. 16, 1880 |
| 295,534 | Frick | Mar. 25, 1884 |
| 382,174 | Mackie | May 1, 1884 |
| 570,914 | Dorman | Nov. 10, 1896 |
| 613,209 | Leblanc | Oct. 25, 1898 |
| 686,856 | Langdon-Davies | Nov. 19, 1901 |
| 1,605,796 | Tanzler | Nov. 2, 1926 |
| 1,829,686 | Swendsen | Oct. 27, 1931 |
| 1,822,264 | Apple | Sept. 8, 1931 |
| 1,875,205 | Apple | Aug. 30, 1932 |
| 2,212,192 | Howell | Aug. 20, 1940 |
| 2,245,577 | Dieckman | June 17, 1941 |
| 2,276,793 | Prince | Mar. 17, 1942 |
| 2,303,638 | Helin | Dec. 1, 1942 |

FOREIGN PATENTS

| Number | Country | Date |
|---|---|---|
| 366,942 | Great Britian | Feb. 4, 1932 |